United States Patent [19]
Ueno et al.

[11] Patent Number: 5,807,920
[45] Date of Patent: Sep. 15, 1998

[54] RETAINER FOR ROLLING-CONTACT ELEMENT

[75] Inventors: Hiroshi Ueno, Tondabayashi; Akira Yamamoto, Kashiwara; Megumi Ohtani, Kashihara; Tadahiro Terada, Kita-Katsuragi-Gun, all of Japan

[73] Assignee: Koyo Seiko Co., Ltd., Chuo-ku, Japan

[21] Appl. No.: 651,783

[22] Filed: May 24, 1996

Related U.S. Application Data

[63] Continuation-in-part of Ser. No. 285,824, Aug. 4, 1994, abandoned.

[30] Foreign Application Priority Data

Aug. 10, 1993 [JP] Japan .................................. 5-198521
Nov. 18, 1993 [JP] Japan .................................. 5-289184

[51] Int. Cl.$^6$ ............................. F16C 33/44; F16C 33/56; C08L 77/00
[52] U.S. Cl. ....................... 524/504; 524/505; 524/514; 525/66; 525/92 B; 525/183; 525/184; 384/527; 384/576
[58] Field of Search ...................... 525/66, 92 B, 525/183, 184; 524/504, 505, 514; 384/527, 576

[56] References Cited

U.S. PATENT DOCUMENTS

| | | | |
|---|---|---|---|
| 4,242,470 | 12/1980 | Gergen | ........................................ 525/92 |
| 4,492,415 | 1/1985 | Baile et al. . | |
| 4,495,324 | 1/1985 | Chacko et al. . | |
| 4,798,855 | 1/1989 | Lausberg et al. . | |
| 4,999,394 | 3/1991 | Yoshida et al. . | |
| 5,118,207 | 6/1992 | Ikejiri et al. . | |
| 5,184,899 | 2/1993 | Harimoto | ................................ 384/560 |
| 5,230,570 | 7/1993 | Bursey et al. . | |

FOREIGN PATENT DOCUMENTS

| | | |
|---|---|---|
| 0 041 079 | 12/1981 | European Pat. Off. . |
| 2 217 395 | 10/1989 | United Kingdom . |

*Primary Examiner*—Patricia A. Short
*Attorney, Agent, or Firm*—Reid & Priest LLP

[57] ABSTRACT

The present invention provides a retainer made of synthetic resin for a rolling-contact element such as a roller of a rolling-contact bearing or a one-way clutch, which is used in a lubricating oil. The retainer comprises an aliphatic polyamide resin as a matrix and a hydrocarbon polymer having no oil resistance and good compatibility with the matrix, which is dispersed in the matrix. Examples of the thermoplastic hydrocarbon polymer include olefin polymer and styrene polymer.

5 Claims, 8 Drawing Sheets

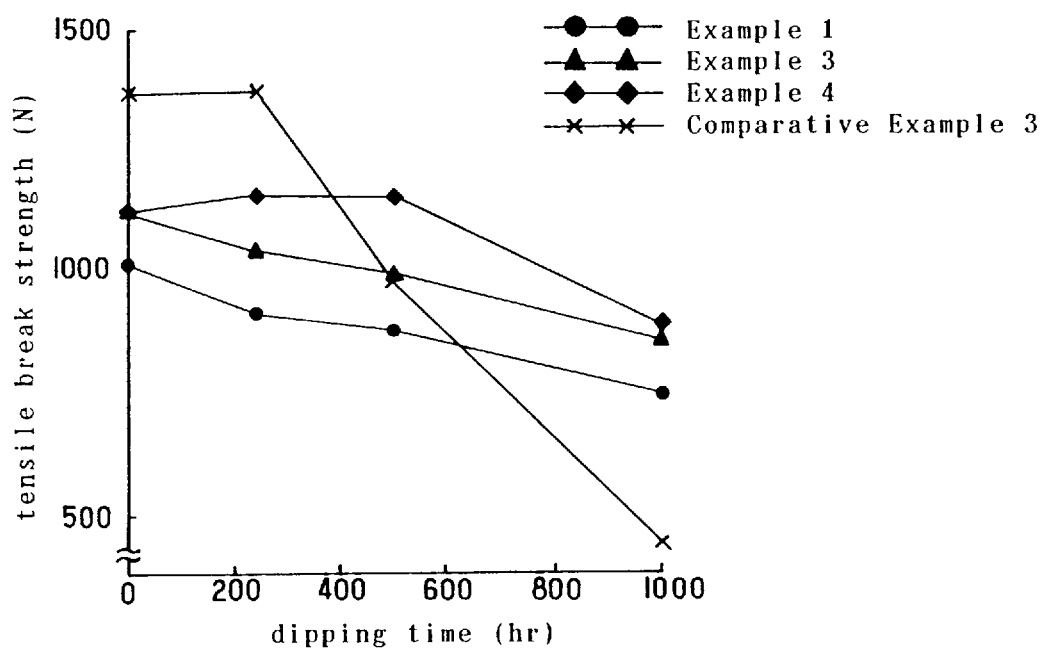
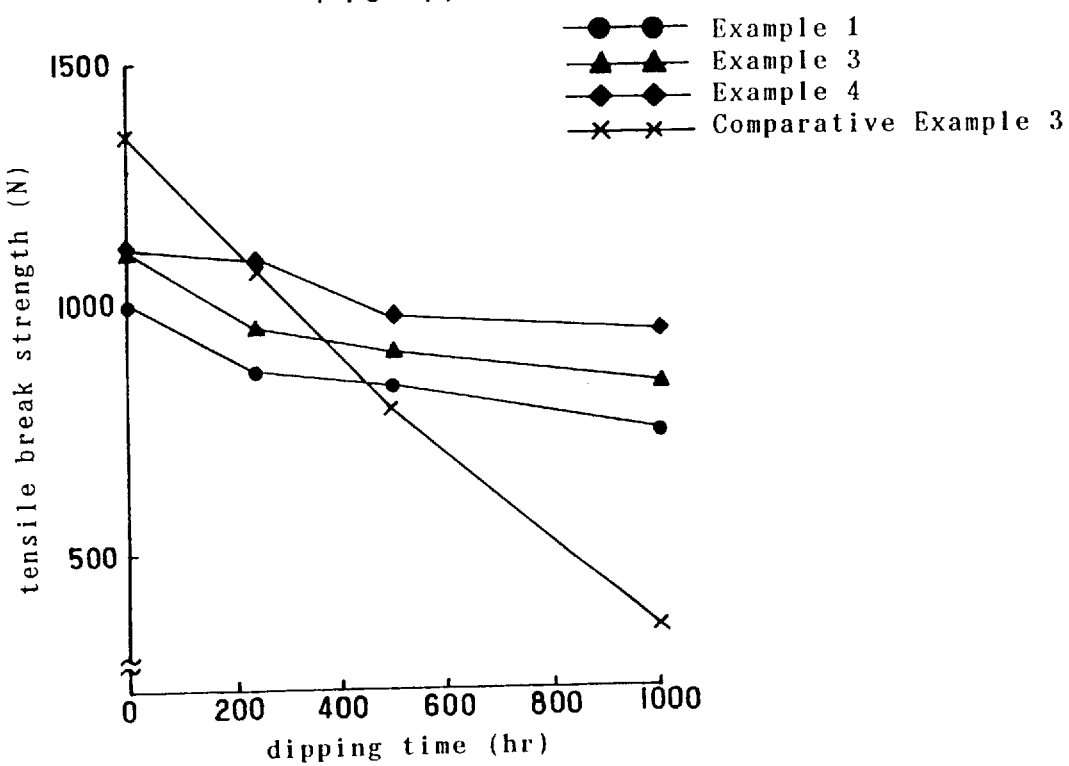

RETAINER FOR ROLLING-CONTACT ELEMENT

This is a continuation-in-part of U.S. patent application No. 08/285,824, filed Aug. 4, 1994, now abandoned.

BACKGROUND OF THE INVENTION

The present invention relates to a retainer made of synthetic resin which is used for retaining a rolling-contact element such as a roller of a rolling-contact bearing or a one-way clutch.

As the retainer for rolling-contact bearing, there have hitherto been used various materials comprising an aliphatic polyamide resin (e.g. nylon 6, nylon 66, nylon 46, etc.) as a matrix, which are lightweight in comparison with those made of metal and are superior in mechanical properties.

However, when the aliphatic polyamide resin is used in a highly heated lubricating oil such as gear oil, its poor durability (oil resistance) leads it to deteriorate with time, which results in great reduction in strength. This is because that the lubricating oil is oxidized under the condition of high temperature to increase its acidity, and the aliphatic polyamide resin is thermally oxidized under this heated, acid atmosphere.

Accordingly, the upper limit of the temperature at which a retainer made of aliphatic polyamide resin matrix for rolling-contact bearing can be employed is about 120° to 130° C. At the higher temperature, a retainer made of metal is normally used at present.

It is also possible to use so-called super engineering plastics usable at a higher temperature, such as polyether sulfone (PES), polyphenylene sulfide (PPS), polyether ether ketone (PEEK), etc., instead of the aliphatic polyamide resin. However, most of super engineering plastics are inferior in flexibility and expensive in comparison with the aliphatic polyamide resin so that their use is limited and they have not put into practical use yet.

OBJECT AND SUMMARY OF THE INVENTION

It is the object of the present invention to provide a retainer made of aliphatic polyamide resin for a retaining a rolling-contact element such as a roller of a rolling-contact bearing or a one-way clutch, which can exhibit excellent oil resistance when using in a lubricating oil at high temperature. A material is considered to have "oil resistance" if its tensile strength is reduced less than 50% after a 1000-hour immersion in an oil heated to 180° C., as compared to its tensile strength prior to immersion. A material is considered to have "no oil resistance" if its tensile strength is reduced 50% or more under the same conditions.

In order to accomplish the object, the present inventors have studied to improve oil resistance of the retainer made of aliphatic polyamide resin matrix for a retaining a rolling-contact element, utilizing a polymer alloy technique. Firstly, they studied to disperse materials having high oil resistance such as polytetrafluoroethylene (PTFE) into an aliphatic polyamide resin matrix, however, oil resistance could not be improved. Then, they studied about other various polymers. As a result, it has been found that, by dispersing a hydrocarbon polymer which has good compatibility with the aliphatic polyamide resin matrix but which itself has no oil resistance, oil resistance of the retainer for a rolling-contact element is dramatically improved, thereby affording oil resistance at high temperature comparable to that of super engineering plastics such as PES, PPS and the like. Thus, the present invention has been accomplished.

That is, the retainer for a rolling-contact element of the present invention provides a retainer made of synthetic resin for a rolling-contact element, which is used in a lubricating oil, characterized in that a hydrocarbon polymer having no oil resistance and good compatibility with an aliphatic polyamide resin matrix is dispersed in the aliphatic polyamide resin matrix.

There may be various causes of dramatic improvement of oil resistance of the retainer for a rolling-contact element of the present invention, and one of such causes may be that the hydrocarbon polymer dispersed in the aliphatic polyamide resin matrix exhibits a masking effect of preventing penetration of oil into the interior of the retainer. Another possibility is that the hydrocarbon polymer having no oil resistance is oxidized prior to the thermal oxidation of the aliphatic polyamide resin matrix to prevent thermal oxidization of the aliphatic polyamide resin matrix.

Considering that the hydrocarbon polymer exhibits the masking effect of preventing permeation of oil, as described above, it follows that the interior of the retainer receives only heat from the high-temperature oil. When the temperature is too high, it may suffer thermal deterioration due to temperature. On the other hand, it is expected that an annealing effect may improve a strength at its initial employment of the retainer, within a certain range of the temperature.

The retainer for a rolling-contact element with the above structure of the present invention uses an aliphatic polyamide resin having excellent retainer characteristics as a matrix, and is composed of an aliphatic polyamide resin and a hydrocarbon polymer which are inexpensive and easily available in comparison with the super engineering plastic. Further, the retainer of the present invention has high-temperature oil resistance comparable to that of the retainer made of super engineering plastic. Therefore, when its characteristics and economy as a retainer are totally evaluated, it is superior to those made of super engineering plastic.

BRIEF EXPLANATION OF THE INVENTION

Figure 8:
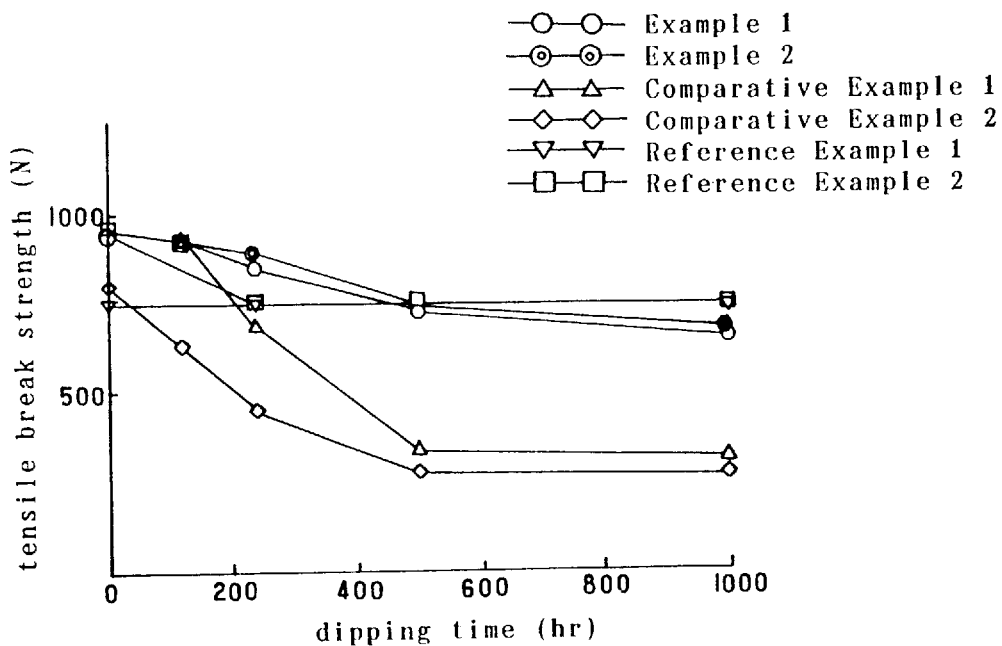

FIG. 8 is a graph illustrating a relation between the dipping time of the crown retainer for ball bearings of Examples 1 and 2, Comparative Examples 1 and 2 and Reference Examples 1 and 2 into a high-temperature oil and the tensile break strength.

Figure 9:
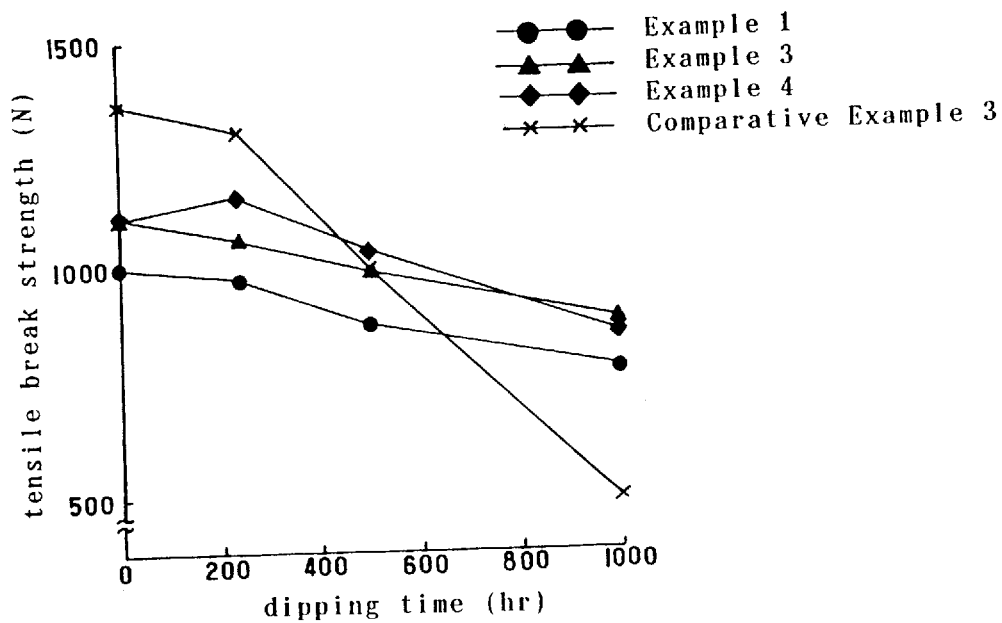

FIG. 9 is a graph illustrating a relation between the dipping time of the crown retainer for ball bearing of Examples 1, 3 and 4 and Comparative Example 3 into a high-temperature oil heated to 140° C. and the tensile break strength.

FIG. 10 is a graph illustrating a relation between the dipping time of the crown retainer for ball bearing of Examples 1, 3 and 4 and Comparative Example 3 into a high-temperature oil heated to 160° C. and the tensile break strength.

Figure 12:
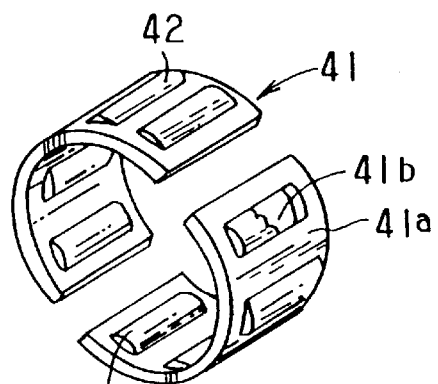

FIG. 11 is a graph illustrating a relation between the dipping time of the crown retainer for ball bearing of Examples 1, 3 and 4 and Comparative Example 3 into a high-temperature oil heated to 180° C. and the tensile break strength. FIG. 12 is a perspective view illustrating a retainer for cylindrical roller bearing split in two, to which the present invention is applied.

Figure 13:
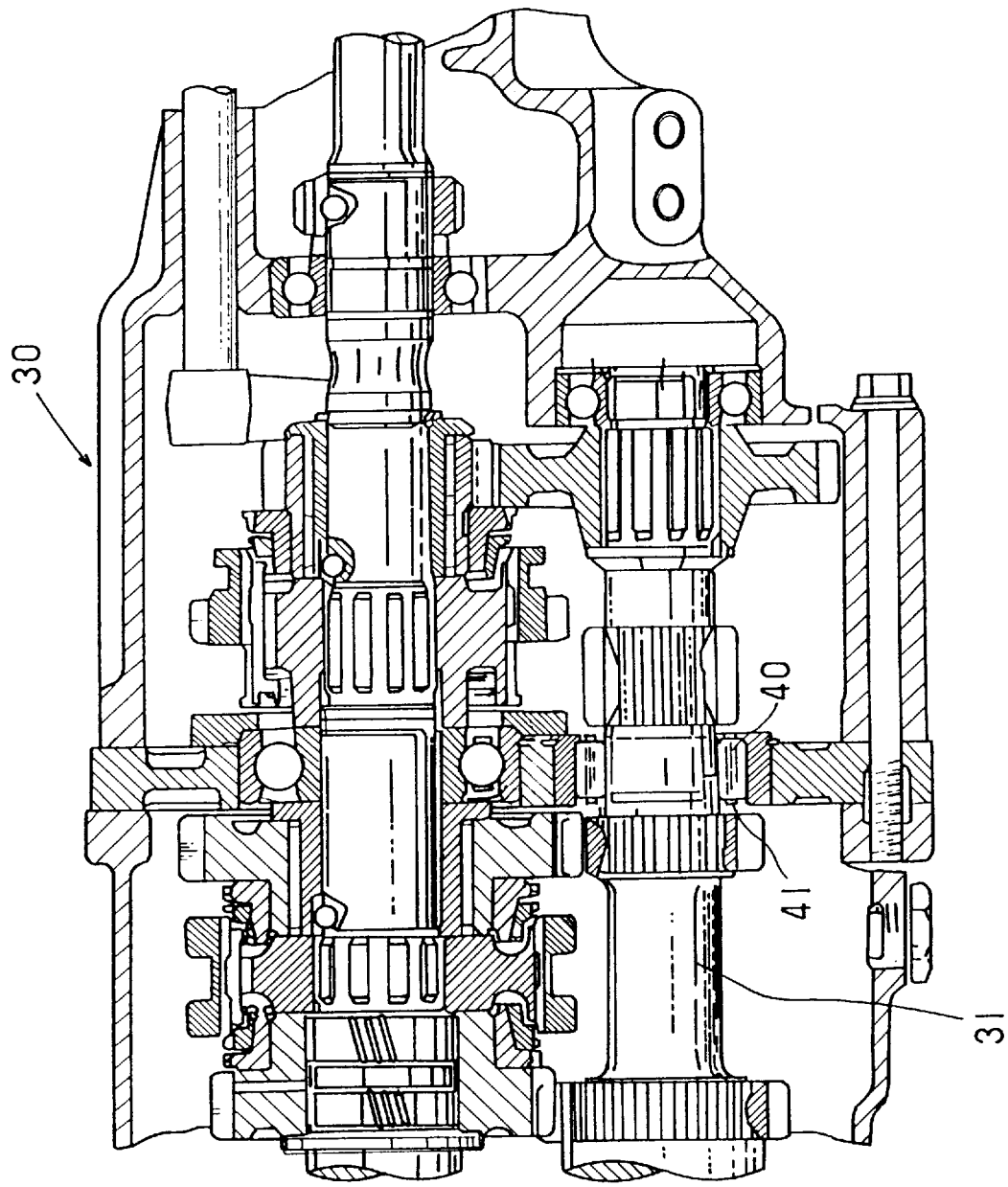

FIG. 13 is a sectional view illustrating the interior of an automotive transmission into which the cylindrical roller bearing split in two is incorporated.

Figure 14:
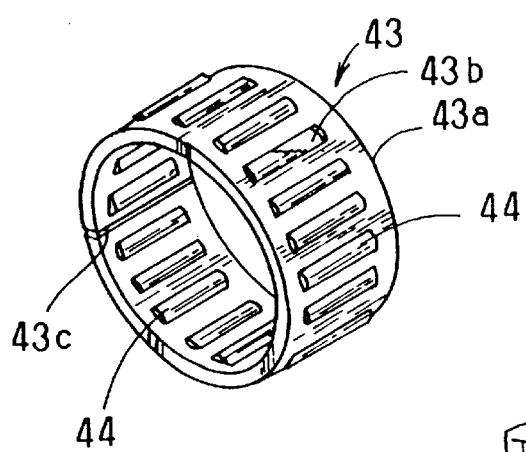

FIG. 14 is a perspective view illustrating a retainer for needle roller bearing split in one portion, to which the present invention is applied.

Figure 15:
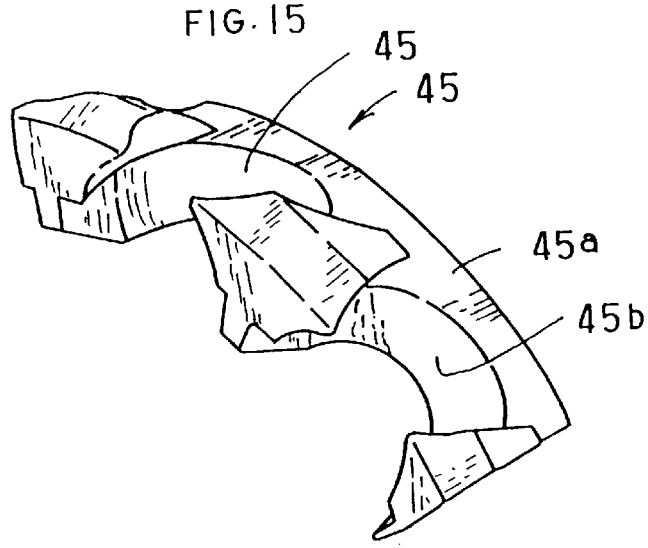

FIG. 15 is a partial perspective view illustrating a retainer for double raw angular ball bearing to which the present invention is applied.

Figure 16:
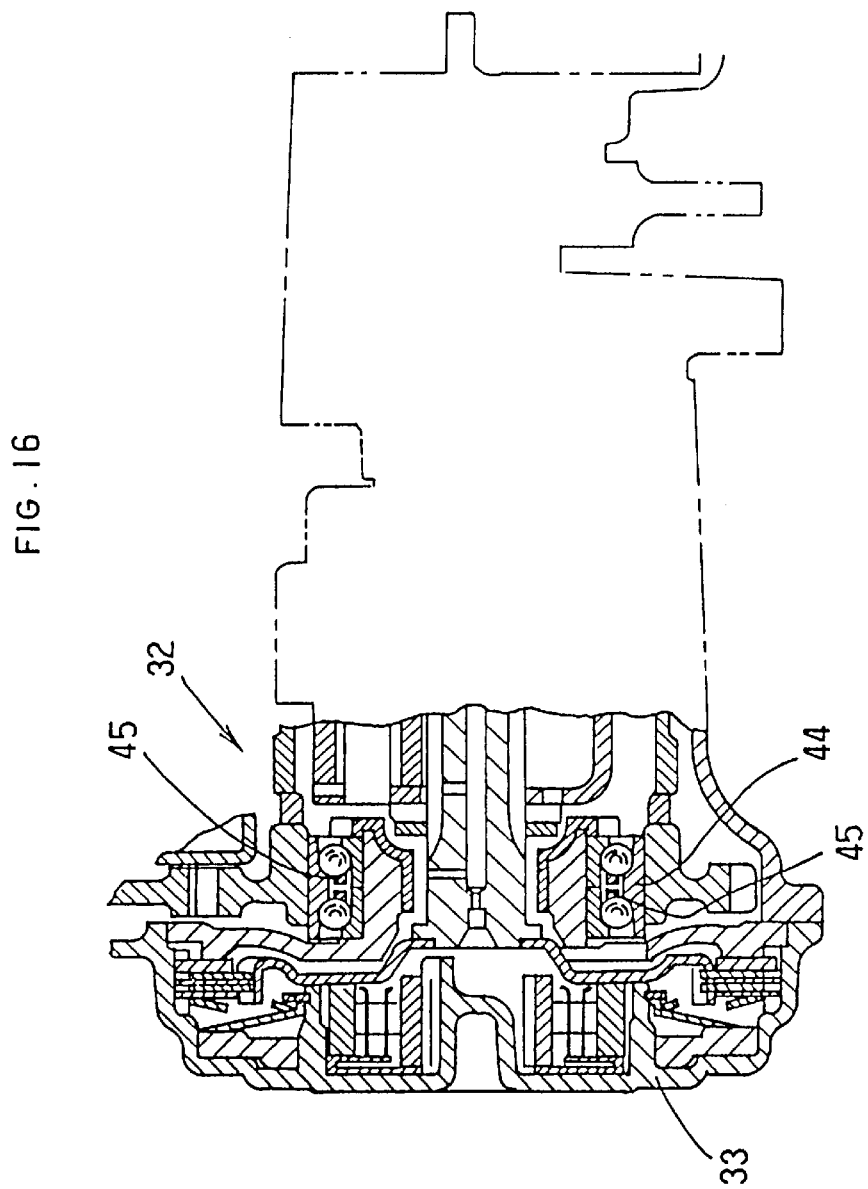

FIG. 16 is a partial sectional view illustrating the interior of an automotive trans-axle into which the double raw angular ball bearing is incorporated.

Figure 17:
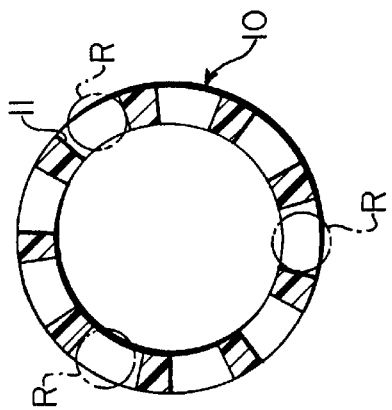

FIG. 17 is a cross-sectional view of a retainer for a one-way clutch, to which the present invention is applied.

DETAILED DESCRIPTION OF THE INVENTION

As described above, the present invention relates to an improvement of a retainer for a rolling-contact element, which comprises an aliphatic polyamide resin as a matrix. This improved retainer for rolling-contact element is used in a lubricating oil heated to the high temperature, such as gear oil, etc., and is composed of a resin comprising an aliphatic polyamide resin as a matrix and a hydrocarbon polymer having no oil resistance in a lubrication oil and good compatibility with the aliphatic polyamide resin matrix, which is dispersed in the aliphatic polyamide resin matrix.

As the aliphatic polyamide resin which is the matrix of the above retainer, for example, there can be used known aliphatic polyamide resins such as nylon 6, nylon 66, nylon 46 and the like. Particularly, most popular nylon 66. i.e. a reaction product of adipic acid and hexamethylenediamine, an aliphatic polyamide resin having a repeating unit represented by the formula (1):

is most preferably used in the present invention because of its low price and easy handling.

As the hydrocarbon polymer to be dispersed in the aliphatic polyamide resin matrix, an olefin polymer which itself has no oil resistance in a lubricating oil is preferable. Examples of the olefin polymer include various polymers having low to high density, such as polyethylene, polypropylene, ethylene-propylene rubber (EPM), ethylene-propylene diene rubber (EPDM) and the like. These olefin polymers can be used as they are, or modified to improve compatibility with the aliphatic polyamide resin matrix. As the modified olefin polymer, there can be used polymers modified by copolymerizing the above respective olefin polymers with α, β-unsaturated carboxylic acids, their esters or metallic salts. Further, polymers modified by grafting carboxylic acids or acid anhydrides into olefin polymers can also be used. In case of EPDM, there can be suitably used polymers modified by grafting maleic anhydrides, of which compatibility with the aliphatic resin matrix has been improved, in the present invention.

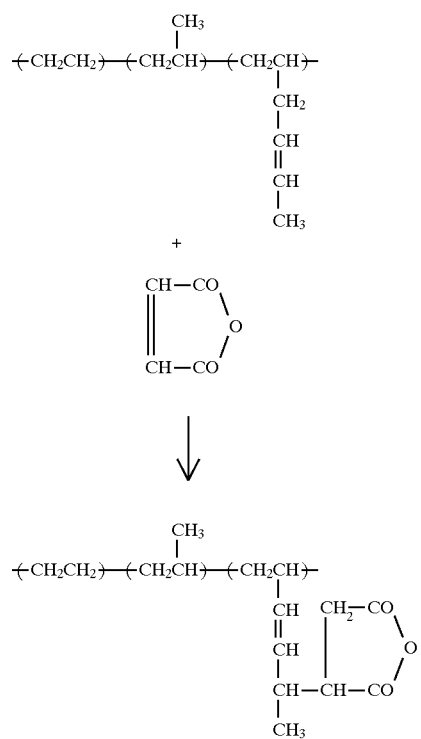

By means of modification described above, compatibility of the olefin polymer to the aliphatic polyamide resin matrix is improved, and oil resistance and impact strength of the retainer are further improved.

These olefin polymers can be used alone or in combination thereof.

As the hydrocarbon polymer to be dispersed in the aliphatic polyamide resin matrix, there can be suitably used a styrene polymer which itself has no oil resistance in a lubricating oil, in addition to the olefin polymer.

Examples of the styrene polymer include a styrene elastomer. The styrene elastomer is generally a block copolymer (styrene block copolymer) having a polystyrene block and an intermediate rubber block, wherein the polystyrene block forms a physical bridge (domain) to become a bridged point and the rubber block plays a role as a soft segment in imparting rubber elasticity.

Examples of the intermediate rubber block include ethylene-butene copolymer (EB), polybutadiene (B), polyisoprene (I) and the like, and the intermediate rubber block is classified into linear and radial types according to a form of arrangement with polystyrene (S). as a hard segment.

In general, physical properties of such a block copolymer is greatly influenced by such factors as (a) length of block molecular chain, (b) manner of bonding, (c) bonding ratio and the like, and desirable characteristics can be obtained by selecting these factors properly.

Examples of the styrene elastomer include styrene-ethylene/butene-styrene block copolymer [S-EB-S], styrene-butadiene-styrene block copolymer [S-B-S (linear) and (S-B) nX (radial)], styrene-isoprene-styrene block copolymer [S-I-S] and the like.

As the production process of the styrene elastomer, there can be used living anion polymerization in the presence of an alkyl lithium catalyst. In order to obtain desirable retainer characteristics, polymerization may be carried out by controlling the number or length of the rubber block or styrene block. For example, the styrene-ethylene/butene-styrene block copolymer [S-EB-S] can be obtained by block-copolymerizing styrenes at both sides of an ethylene/butene copolymer having no residual double bond, which has been saturated by addition of hydrogen to polybutadiene.

Regarding the proportion of hydrocarbon polymers such as olefin polymer, styrene polymer, etc., the proportion of the hydrocarbon polymer is preferably within a range from 5 to 25% by weight, more preferably from 8 to 25% by weight, based on the total components. When the proportion of the hydrocarbon polymer is less than 5% by weight based on the total components, though depending upon the size or shape of the retainer, the addition effect of the hydrocarbon polymer is not obtained sufficiently. Further, when the proportion of the hydrocarbon polymer largely exceeds 25% by weight, the relative amount of the aliphatic polyamide resin decreases and problems on physical properties and mechanical strength may be arisen.

Reinforcing fibers can be blended in the retainer for a rolling-contact element of the present invention in order to further increase its mechanical strength and heat resistance, similar to the prior art. Examples of the reinforcing fiber include glass fiber, carbon fiber, fibrous wollastonite, silicon carbide fiber, boron fiber, alumina fiber, Si—Ti—C—O fiber, metallic fiber (e.g. copper, steel, stainless steel, etc.), aromatic aliphatic polyamide (alamide) fiber, potassium titanate whisker, graphite whisker, silicon carbide whisker, silicon nitride whisker and the like. These can be used alone or in combination.

Regarding the proportion of the reinforcing fiber, the proportion of the reinforcing fiber is preferably within a range from 8 to 40% by weight based on the total components. When the proportion of the reinforcing fiber is less than 8% by weight based on the total components, the addition effect of the reinforcing fiber is not obtained sufficiently, and mechanical strength and heat resistance of the retainer may not be sufficiently improved. Further, when the proportion of the reinforcing fiber exceeds 40% by weight, flexibility of the retainer is deteriorated, thereby causing break or crack when molded articles are removed from molds or roller elements are pressed into pockets, particularly in case of the retainer having a pocket with an undercut shape.

The retainer for a rolling-contact element of the present invention may contain, in addition to the above respective components, various additives such as inorganic fillers as colorants, copper or organic stabilizers, etc., in the amount similar to the prior art.

The retainer for a rolling-contact element is produced by melting/kneading the above respective components to form into a molding material such as pellets, powders, etc., followed by molding using an injection molding machine, similar to the prior art.

The present invention can be applied to various retainers for a rolling-contact element such as ball bearing, needle roller bearing, cylindrical roller bearing, tapered roller bearing and the like; as well as to retainers for a one-way clutch. Particularly, the present invention can be suitably applied to the retainer with the undercut shape.

In the retainer for a rolling-contact element of the present invention, a hydrocarbon polymer having no oil resistance and good compatibility with an aliphatic polyamide resin matrix is dispersed in the aliphatic polyamide resin matrix so that oil resistance when used in a heated lubricating oil can be greatly improved comparable to that of the super engineering plastic. Further, the retainer for a rolling-contact element of the present invention has flexibility which can not be obtained in the retainer made of super engineering plastic. Moreover, since the retainer for a rolling-contact element of the present invention is composed of the aliphatic polyamide resin and hydrocarbon polymer, it is easily available and inexpensive in comparison with those made of super engineering plastic.

The retainer for a rolling-contact element of the present invention is suitably employed for a rolling-contact bearings used in a lubricating oil heated to a maximum temperature of 180° C. to 220° C. Examples of the rolling-contact bearing include a cylindrical roller bearing 40 used as a counter center bearing for supporting the central part of a counter shaft 31 of an automotive transmission 30 with rotating freely (see FIG. 13), or a needle roller bearing. The retainer 41 for cylindrical roller bearing 40 is produced by forming a plurality of pockets 41*b* for introducing a cylindrical roller 42 into an annular body 41*a* split in two and composed of a synthetic resin wherein the hydrocarbon polymer is dispersed in the aliphatic polyamide resin matrix (see FIG. 12). Further, the retainer 43 for needle roller bearing is produced by forming a plurality of pockets 43*b* for introducing a needle roller 44 into an annular body 43*a* composed of a synthetic resin wherein the hydrocarbon polymer is dispersed in the aliphatic polyamide resin matrix (see FIG. 14). The annular body 43*a* is split at one part of the circle, and it is incorporated into the counter shaft 31 by widely opening the split part 43*c*. Therefore, the retainer 43 for needle roller bearing is required to have oil resistance and flexibility. Accordingly, the retainer of the present invention is suitably used.

Further, examples of the other a rolling-contact bearing used in a lubricating oil heated to a maximum temperature of 180° C. to 220° C. include a double raw angular ball bearing 44 for rotatable supporting a clutch drum 33 of an automotive trans-axle 32 (see FIG. 16). The retainer 45 for double raw angular ball bearing 44 is produced by forming a plurality of half-round pockets 45*b* for introducing balls 42 into an annular body 45*a* composed of a synthetic resin wherein the hydrocarbon polymer is dispersed in the aliphatic polyamide resin matrix (see FIG. 15).

An example of the retainer for a one-way clutch of the present invention is a retainer for a one-way clutch as disclosed in Japanese Published Unexamined Patent Application No. 8-74888, which is incorporated herein by reference in its entirety. Such a one-way clutch is used, for example, in a two-wheeled vehicle such as a motorcycle. In a two-wheeled vehicle, the one-way clutch is part of a starter to start the engine by rotating the crankshaft of the engine by kicking a kick lever. The one-way clutch prevents rotation of the crankshaft from being transmitted to the kick lever.

With reference to FIG. 17, this type of retainer for a one-way clutch comprises, for example, a cylindrical body 10 made of a synthetic resin. The cylindrical body 10 is structured to provide a plurality of pockets 11 formed around its periphery and which connect its inner and outer peripheral surfaces, the pockets 11 retaining a roller R of a one-way clutch.

EXAMPLES

Example 1

56.6 Parts by weight of nylon 66 as an aliphatic polyamide resin matrix, 13.4 parts by weight of EPDM modified by grafting maleic anhydride as an olefin polymer, 30.0 parts by weight of a glass fiber as a reinforcing fiber and a small amount of a stabilizer were melted/kneaded, and then pelletized with a pelletizer to produce pellets for injection molding as a molding material.

Figure 1:
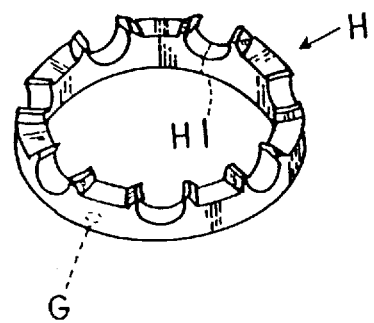
FIG. 1 is a perspective view illustrating a one embodiment of the crown retainer for ball element of the present invention.
Figure 2:
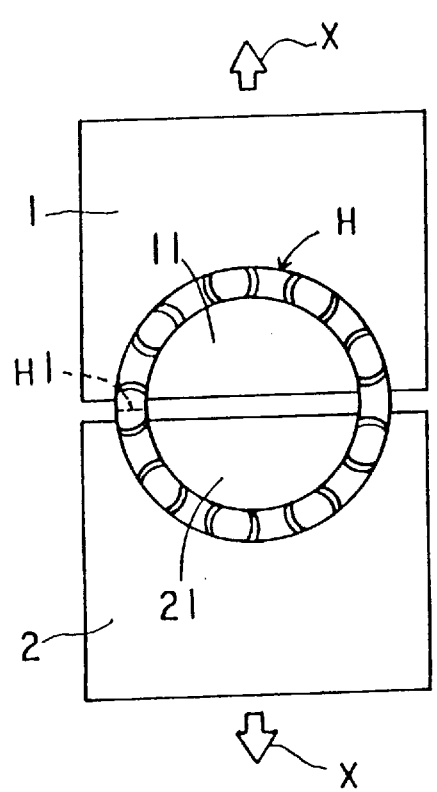
FIG. 2 is a front view illustrating a measurement method of strength of the crown retainer for ball bearing.
Figure 3:
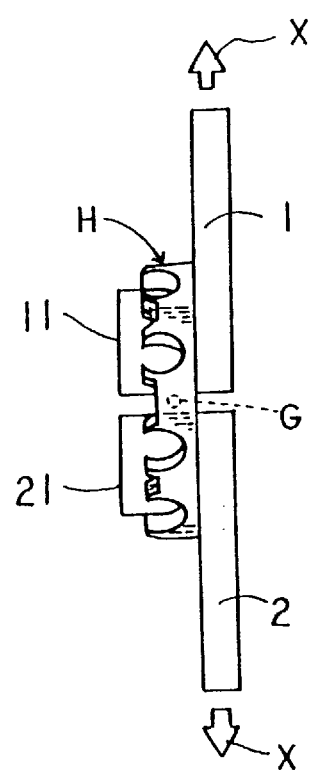
FIG. 3 is a side view illustrating a measurement method of strength of the crown retainer for ball bearing.
Figure 4:
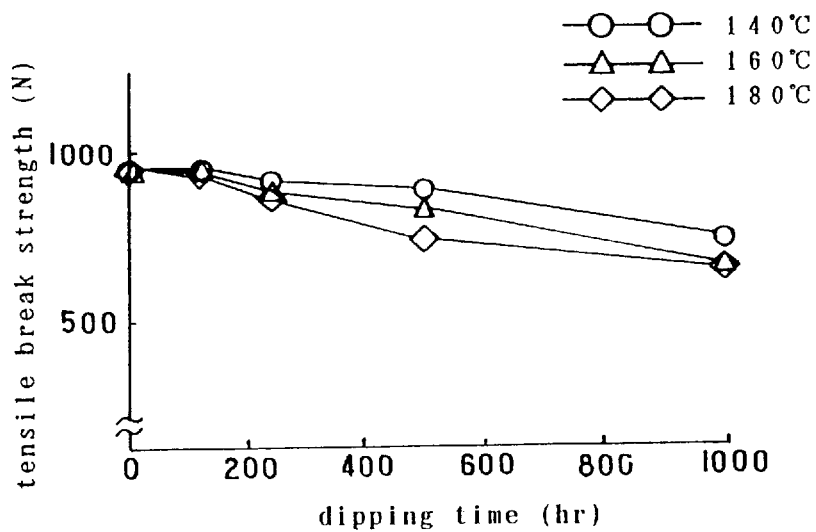
FIG. 4 is a graph illustrating a relation between the dipping time of the crown retainer for ball bearing of Example 1 into a high-temperature oil and the tensile break strength.
Figure 5:
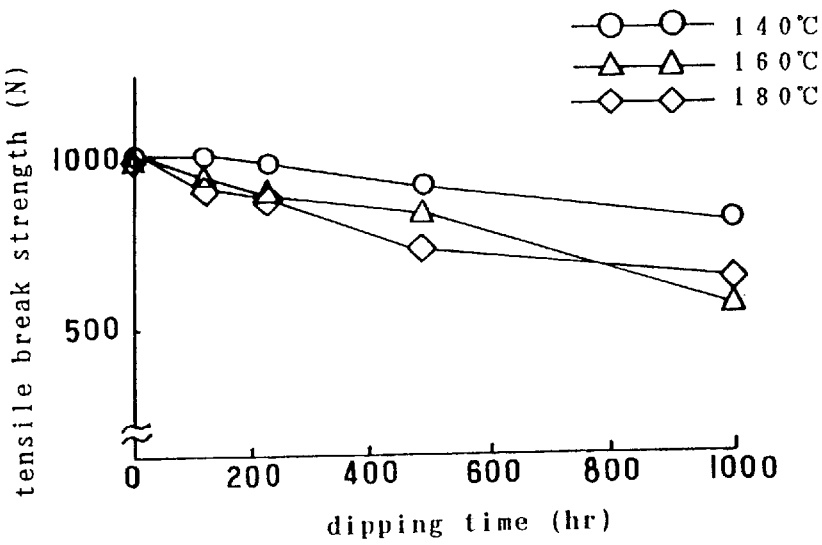
FIG. 5 is a graph illustrating a relation between the dipping time of the crown retainer for ball bearing of Example 2 into a high-temperature oil and the tensile break strength.
Figure 6:
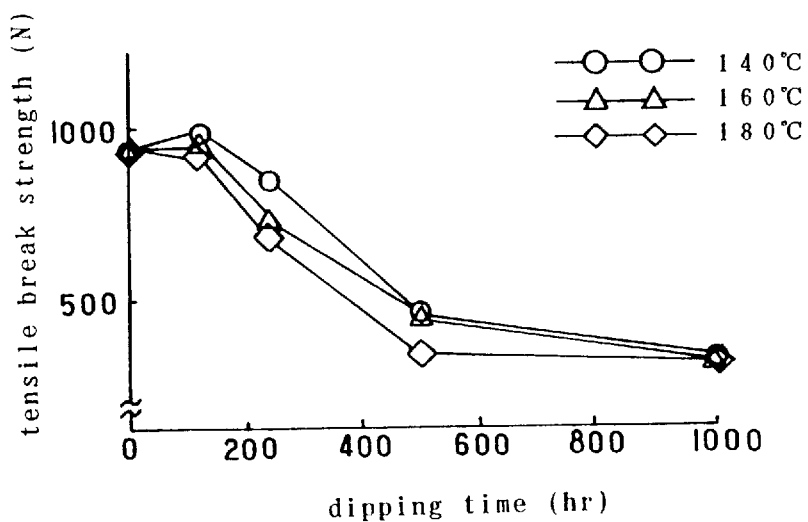
FIG. 6 is a graph illustrating a relation between the dipping time of the crown retainer for ball bearing of Comparative Example 1 into a high-temperature oil and the tensile break strength.
Figure 7:
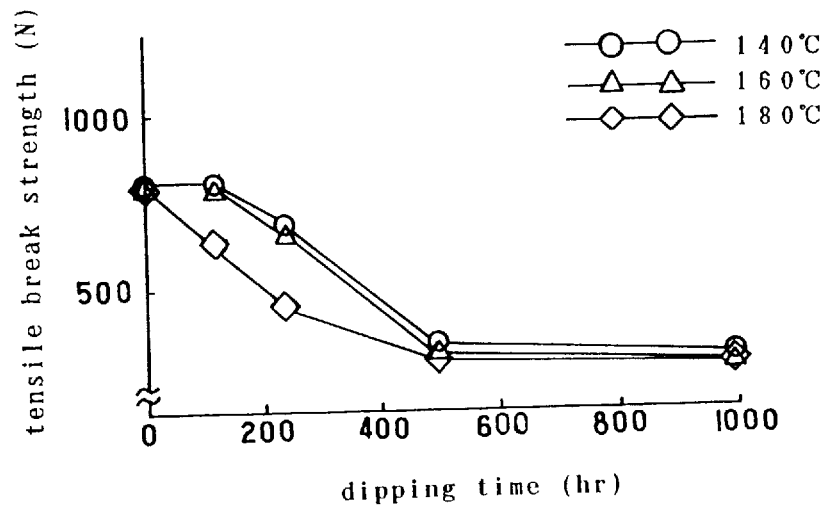
FIG. 7 is a graph illustrating a relation between the dipping time of the crown retainer for ball bearing of Comparative Example 2 into a high-temperature oil and the tensile break strength.

By using the pellets for injection molding, a crown retainer for ball bearing H (inner diameter: 59 mm, outer diameter: 64 mm) having a shape shown in FIG. 1 was produced by injection molding (side face 1-point gate). In FIG. 1, the symbol G is a gate position, the symbol H1 is a weld line of the molded product generated at the position symmetrical to the gate position G.

Example 2

56.6 Parts by weight of nylon 66 as an aliphatic polyamide resin matrix, 13.4 parts by weight of a styrene-ethylene/butene-styrene block copolymer [S-EB-S] as a styrene polymer, 30.0 parts by weight of a glass fiber as a reinforcing fiber and a small amount of a stabilizer were melted/kneaded, and then pelletized with a pelletizer to produce pellets for injection molding as a molding material.

By using the pellets, a crown retainer for ball bearing H having a shape shown in FIG. 1 was produced according to the same manner as that described Example 1.

Comparative Example 1

According to the same manner as that described in Example 1 except that no modified EPDM was used. Pellets for injection molding were prepared by melting/kneading 75.0 parts by weight of nylon 66, 25.0 parts by weight of a glass fiber and a small amount of a stabilizer, a crown retainer for ball bearing H having a shape shown in FIG. 1 was produced.

Comparative Example 2

According to the same manner as that described in Example 2 except that no styrene polymer was used. Pellets for injection molding were prepared by melting/kneading 70.0 parts by weight of nylon 46 having better heat resistance than that of nylon 66, i.e. a reaction product of 1,4-diaminobutane and adipic acid, an aliphatic polyamide resin having a repeating unit represented by the formula (2):

—[HN—(CH$_2$)$_6$—NH—CO—(CH$_2$)$_4$—CO]—  (2)

30.0 parts by weight of a glass fiber and a small amount of a stabilizer, a crown retainer for ball bearing H having a shape shown in FIG. 1 was produced.

The following respective tests were carried out as to the above Examples and Comparative Examples.

By installing the respective crown retainers for ball bearing H of Examples 1 and 2 and Comparative Examples 1 and 2 onto protrusions 11, 21 so as to arrange its weld line H1 between a couple of jigs 1, 2, the initial values of the break strength (N) obtained when both jigs were stretched in upper and lower directions, as shown in arrows X in the drawings was measured.

Then, a plurality of crown retainers for ball bearing H of Examples 1 and 2 and Comparative Examples 1 and 2 were dipped in an automatic transmission oil heated to 140° C., 160° C. or 180° C., the break strength (N) after heat treatment was measured at intervals of constant period of time in a similar way as described above. The measurement results of Example 1, Example 2, Comparative Example 1 and Comparative Example 2 are shown in FIG. 4, FIG. 5, FIG. 6 and FIG. 7, respectively. In these drawings, the plots —○—○—, —△—△— and —◊—◊— show the results at 140° C., 160° C. and 180° C., respectively.

Further, a crown retainer for ball bearing produced from pellets for injection molding prepared by melting/kneading 70.0 parts by weight of polyphenylsulfide (PPS) as a super engineering plastic, 30.0 parts by weight of a glass fiber and a small amount of a stabilizer (Reference Example 1), and a crown retainer for ball bearing produced from pellets for injection molding prepared by melting/kneading 80.0 parts by weight of polyether sulfone (PES), 20.0 parts by weight of a glass fiber and a small amount of a stabilizer (Reference Example 2) were subjected to the similar break strength test after heat treatment at 180° C. The results are shown in FIG. 8 along with the results of Examples 1 and 2 and Comparative Examples 1 and 2 at 180° C. In FIG. 8, the plots —○—○—, —⊙—⊙—, —△—△—, —◊—◊—, —▽—▽— and —□—□— show the results of Example 1, Example 2, Comparative Example 1, Comparative Example 2, Reference Example 1 and Reference Example 2, respectively.

As is apparent from the results shown in FIG. 4 to FIG. 8, the retainers of Comparative Examples 1 and 2 wherein no modified EPDM and no styrene polymer, respectively, have been blended exhibit great reduction in break strength within 500 hours at any temperature. Accordingly, it is apparent that the retainers of Comparative Examples 1 and 2 are deteriorated by thermally oxidized in a high-temperature oil. To the contrary, the retainers of Examples 1 and 2 exhibit no great reduction in break strength within 1000 hours, and it was confirmed that they have excellent oil resistance comparable to that of the super engineering plastic such as PPS, PES and the like.

Examples 3 and 4 and Comparative Example 4

According to the same manner as that described in Example 1 except for blending nylon 66, modified EPDM and a glass fiber in the proportion shown in Table 1, a crown retainer for ball bearing H having a shape shown in FIG. 1 was produced.

TABLE 1

|  | Amount (parts by weight) | | |
|---|---|---|---|
|  | Nylon 66 | Modified EPDM | Glass fiber |
| Example 3 | 60.0 | 10.0 | 30.0 |
| Example 4 | 63.3 | 6.7 | 30.0 |
| Com. Example 3 | 70.0 | 0 | 30.0 |

Regarding the above Examples 3 and 4 and Comparative Example 3, the strength of the retainer was measured according to the same manner as that described above. The measurement results at 140° C., 160° C. and 180° C. are shown in FIG. 9, FIG. 10 and FIG. 11, respectively, along with the measurement results of Example 1 (measurement results of Example 2 are almost the same as those of Example 1 so that they are not shown in FIG. 9 to FIG. 11). In these drawings, the dots —●—●—, —▲—▲—, —◆—◆— and —×—×— show the results of Example 1, Example 3, Example 4 and Comparative Example 3, respectively.

As is apparent from the results shown in FIG. 9 to FIG. 11, the retainer of Comparative Example 3 wherein no modified EPDM has been blended exhibits high break strength at the initial stage of heating, but the break strength is rapidly decreased due to thermal oxidization in a high-temperature oil. Accordingly, it is apparent that the retainer of Comparative Example 3 is deteriorated by thermally oxidized in a high-temperature oil. To the contrary, the retainers of Examples 1 to 4 exhibit no great reduction in break strength within 1000 hours, and it was confirmed that they have excellent oil resistance.

The present invention may be embodied in other specific forms without departing from the spirit or essential characteristics thereof. The present embodiment is therefore to be considered in all respects as illustrative and not restrictive.

What is claimed is:

1. A retainer for a rolling-contact element used in a lubricating oil the maximum temperature of which reaches 180° C. to 220° C., said retainer being made of a synthetic resin comprising an aliphatic polyamide resin matrix, and a compound of a reinforcing fiber and a modified olefin polymer dispersed in said aliphatic polyamide resin matrix, said modified olefin polymer having no oil-resistance and good compatibility with said aliphatic polyamide resin matrix, wherein said modified olefin polymer is ethylene-propylene-diene rubber modified by graft copolymerizing with a compound selected from the group consisting of α, β-unsaturated carboxylic acid, an acid anhydride thereof, an ester thereof, and a metal salt thereof;

wherein said modified olefin polymer is present in a range from 5% to 25% by weight, said reinforcing fiber is present in a range of from 8% to 40% by weight, and the remainder of the weight of said synthetic resin consists essentially of said aliphatic polyamide.

2. The retainer according to claim 1, wherein said modified olefin polymer is an ethylene-propylene-diene rubber grafted with maleic anhydride.

3. The retainer according to claim 1, wherein said aliphatic polyamide resin matrix has at least one member selected from the group consisting of nylon 6, nylon 66, and nylon 46.

4. A retainer for a a rolling-contact element used in a lubricating oil the maximum temperature of which reaches 180° C. to 220° C., said retainer being made of a synthetic resin comprising an aliphatic polyamide resin matrix, and a compound of a reinforcing fiber and a styrene polymer dispersed in said aliphatic polyamide resin matrix, said styrene polymer having no oil-resistance and good compatibility with said aliphatic polyamide resin matrix, and wherein said styrene polymer is styrene-ethylene/butene-styrene block copolymer, wherein said styrene polymer is present in a range from 5% to 25% by weight, said reinforcing fiber is present in a range of from 8% to 40% by weight, and the remainder of the weight of said synthetic resin consists essentially of said aliphatic polyamide.

5. The retainer according to claim 4, wherein said aliphatic polyamide resin matrix is selected from the group consisting of nylon 6, nylon 66, and nylon 46.

* * * * *